Patented May 31, 1938

2,119,141

UNITED STATES PATENT OFFICE 2,119,141

PROCESS OF TREATING FISH OILS

Anderson W. Ralston and Stewart T. Bauer, Chicago, Ill., assignors to Armour and Company, Chicago, Ill., a corporation of Illinois No Drawing. Application June 11, 1936, Serial No. 84,769

12 Claims. (Cl. 87—12)

This invention relates to processes of treating fish oil and other marine oils, and it comprises processes wherein the fish oils or the fatty acids of the fish oil are partially hydrogenated to increase the melting point thereof but the extent of hydrogenation restricted so that the hydrogenated product is still substantially unsaturated, and the partially hydrogenated fish oil or fish oil fatty acids are then treated with isomerizing agents to further increase the melting point without substantially decreasing unsaturation.

Large quantities of unsaturated fats and fatty acids, such for example, as olein and oleic acid are basic raw materials for the soap industry. Since the liquid unsaturated fatty acids do not yield hard soaps, it is customary to hydrogenate the unsaturated fat or fatty acid in order to raise the melting point of the fatty acids thereof and thus convert them into solid fatty acids which will yield hard soaps.

Hydrogenation is also used to some extent for the purpose of converting the liquid marine and fish oils to solid glycerides which, upon saponification give hard soaps. Hydrogenation is a prerequisite to the use of fish oils in most industrial relations because the hydrogen treatment deodorizes the fish oil in addition to raising the melting point.

However, none of these processes for treating highly unsaturated fats or fatty acids to fit them for use in soap-making completely satisfy the requirements in the art. Detergent action, and the commercial acceptability of a soap, are measured largely by the quantity of foam or suds produced from a given quantity of soap solution under certain carefully regulated conditions. For example, a measure of the relative effectiveness of two soaps can be had by shaking dilute solutions thereof, usually about 0.3 percent, in test tubes for equal lengths of time and then noting the height of foam or suds above the liquid soap solution.

It is common knowledge that the soaps of the unsaturated fats or fatty acids give more foam or suds than soaps made from fully saturated fatty acids, such as stearic. For example, sodium oleate is a much better suds-former than sodium stearate. But for domestic and commercial laundry purposes, toilet soaps, soap flakes, and the like made from oleic acid would be undesirable because of the liquid nature of the soap.

Consequently, although a decrease in unsaturation must accompany hardening of the unsaturated fats, or fatty acids and must be accompanied by a decrease in foaming ability, the art has been obliged to accept decreased foaming in order to have a hardened oil which would give a commercially satisfactory soap.

This situation is particularly true when fish oils or other marine oils are used for soap making purposes. Fish oils are highly unsaturated, much more so than ordinary oleic acids, and fish oil fatty acids give soaps of high suds-forming power. But not only are such soaps liquid, they also have the characteristic odor of fish oil. Hence soaps from ordinary fish oil fatty acids are of no commercial significance. When the fish oil is hydrogenated to increase the melting point of its fatty acids to that which will give a hard soap, the extremely desirable foaming properties decrease materially.

The prior art can therefore be epitomized by saying that highly unsaturated fats and fatty oils must be hydrogenated in order to make their fatty acids useful in making hard soaps but such hydrogenation to proper melting point greatly decreases the inherent foaming ability of the unhydrogenated fatty acids.

We have now set outselves to the problem of treating the highly unsaturated fatty oils of the type of fish oils in such fashion that the melting point of their fatty acids can be raised to a degree sufficient to give a hard soap but, at the same time, retaining the inherent suds-forming power of the unsaturated fish oil fatty acids. As pointed out above, these things have been hitherto considered almost incompatible with each other.

We have discovered that if we but partially hydrogenate a fish oil so that the melting point is increased somewhat, and then treat the oil, which is still markedly unsaturated, with isomerizing agents, we can further increase the melting point of the oil up to the desired melting point prior to saponification without reducing the extent of saturation in the oil. In this way we are able to raise the melting point of the fish oils and fish oil fatty acids to the extent necessary but at the same time retain in the fish oil or fatty acid a large proportion of its unsaturation. Thus, we have been able to produce hardened fats whose fatty acids have excellent suds-forming properties when converted to hard soaps.

Our invention is applicable to the improvement of all fish oils and fish oil fatty acids regardless of source provided the fish oils or fatty acid is one which will form stereoisomers, or is one which, after partial hydrogenation, will form stereoisomers. At this point it may be helpful if we indicate what is meant by isomerization in this art. This term is used to indicate the transformation of an unsaturated fat or unsaturated fatty acid into its geometric isomer. For example, normal oleic acid will, upon treatment with isomerizing agents, such as nitrous acid, sulfur dioxide and nitric acid, selenium, and other catalytic substances, undergo a change in structure to form a stereoisomer known as elaidic acid. Oleic acid is liquid at room temperature whereas eladic acid melts at about 51° C. In the same manner these isomerizing catalysts convert triolein to trielaidin. Many other unsaturated fatty acids will undergo conversion to substances of higher melting point. For example, ricinoleic acid, a constituent in castor oil, can be transformed into ricinelaidic acid having a melting point of 53° C. Likewise, erucic acid can be isomerized to brassidic. This acid is a common constituent in rapeseed oil.

Not all unsaturated fats or fatty acids undergo isomerization (sometimes also referred to as elaidinization). For example, the highly unsaturated drying oils remain liquid when treated with nitrous acid. Nevertheless, if the highly unsaturated drying oil be partially hydrogenated to reduce its unsaturation somewhat and increase its melting point somewhat, the melting point can be further increased by treatment of the partially hydrogenated drying oil with an isomerizing catalyst. At the same time, however, the unsaturation, or iodine number of the partially hydrogenated oil is not substantially changed. This means that from the drying oils we can prepare partially hydrogenated and isomerized fatty materials which give excellent soaps.

Processes of hydrogenation are so well understood in the art that we shall not describe them in detail. Likewise methods of isomerizing unsaturated fats and fatty oils are also understood in the art and full and explicit directions with respect thereto are unnecessary for those skilled in the art to practice our invention. In the specific examples which we shall presently describe we do, however, give general directions for carrying out these processes.

Although, as stated, our invention is applicable to the conversion of unsaturated fats and fatty acids to relatively high melting point fats and fatty acids which still retain substantial unsaturation, we find that our invention is particularly useful in the treatment of fish and marine oils for soap making purposes. We shall therefore describe specific examples in connection with the treatment of these glycerides. For most practical purposes, the ordinary soap-making vegetable fats and animal fats do not require any special treatment. Soaps have been made from these sources for many years and, while our invention is applicable to the unsaturated fatty acid sources of this nature, its greatest utility is in the preparation of fish and marine oils for soap making.

References will be found in the literature and patents to the hydrogenation of fish oils to solid glycerides and the subsequent saponification thereof to form soaps. For reasons pointed out above such soaps do not have satisfactory lathering properties. Nevertheless, the fish oils are extremely cheap and abundant and any way of treating them so that they are more suitable for soap making purposes would be of substantial economic importance.

We shall now describe advantageous methods of treating fish oils for this purpose.

For example, we hydrogenate a fish oil with gaseous hydrogen at the usual hydrogenating temperatures, namely about 180° C., and in the presence of a nickel catalyst for about one half hour until the normally liquid fatty acids of the fish oil have been hardened to a melting point of 33° C. Further hydrogenation would increase the melting point of the acids but at the expense of unsaturation. Consequently, we stop the hydrogenation of the fish oil when the melting point of the acids therein has been raised to about 30° to 35° C. We then withdraw the partially hydrogenated fish oil from the hydrogenator, filter off the catalyst, and treat the oil with an isomerizing agent. For example, we can treat the oil with nitrous acid in ways well known and this isomerizing action increases the melting point of the fatty acids in the fat to between 38° and 40° C. Instead of using nitrous acid, we can heat the partially hydrogenated fat with a solid isomerizing catalyst such as selenium at a temperature of about 200° C., for a period of from 1 to 5 hours.

In order to compare the differences in behavior between soaps made from the fatty acid of the untreated fish oil, fatty acid from the fish oil treated in accordance with our invention and fatty acids from the fish oil which has been substantially hydrogenated to give acids having a melting point of about 40° C., we make up an 0.3 percent solution of sodium soaps of these various acids in water and shake equivalent quantities of the solution in test tubes at a temperature of about 60° C. The amount of foam in the test tube is then measured. Soaps from fish oil fatty acids which have been subjected to partial hydrogenation and isomerization in accordance with our invention gave a foam height of 5.3 inches. Soaps from the untreated fish oil fatty acids gave a height of 3.8 inches and soaps from fish oil fatty acids which had been raised in melting point to about 40° C. by straight hydrogenation, without isomerization, gave a foam height of about 3 inches. These tests indicate that the untreated acids give somewhat better soaps than acids which have been hydrogenated only, but the best results are secured when hydrogenation is but partial and further increase in melting point of the acids is obtained by isomerization without substantially affecting the degree of unsaturation.

The extent of partial hydrogenation and isomerization is, of course, susceptible to rather wide modification.

Generally isomerization increases the melting point of the partially hydrogenated fish oil fatty acids about 5° to 10° C. This increase in melting point does not seem to be governed very much by the actual extent of partial hydrogenation. For example, when we hydrogenate so that the fish oil fatty acids have a melting point of 33° C., isomerization increases the melting point of the acids to about 38° C. When the fish oil is somewhat more extensively hydrogenated, for example for a period of one and one half hours until the melting point of the fatty acids has been raised to about 42° C., isomerization increases the melting point of fatty acids to about 48° to 50° C. In order to maintain good lathering quantities we find it better to keep the unsaturation as high as possible consistent with the formation of fatty acids which will yield hard soaps. This means that in general we prefer to discontinue hydrogenation when the melting point of the fatty acids has been raised to about 30° to 35° C., and then obtain a further increase in melting point by isomerizing the partially hydrogenated fat. Hydrogenation of the fish oils should, of course, proceed to an extent sufficient to deodorize the oil.

In a similar manner, we can start with fats containing mostly olein and partially hydrogenate until the melting point, for example, has been raised to about 30° C. We then further increase the melting point by treating the partially hydrogenated fat with selenium, nitrous acid, or other isomerizing agent.

The drying oils containing quantities of linoleic and linolenic acids can likewise be hydrogenated until much of the highly unsaturated acid is converted to oleic, a part of the oleic further hydrogenated and the remainder isomerized as we have described.

Although we can start with the free fatty acids of fish oil, and being a mixture of those fatty acids liberated from fish oil by splitting, we find it better to partially hydrogenate the glycerides themselves since the hydrogenation of free fatty acid is attended with some disadvantages. After obtaining the partially hydrogenated fat or fish oil, we find it better to directly subject the material to the action of isomerizing agents but at this stage we can, if desired, saponify the partially hydrogenated fat, recover the free fatty acids, and subject these acids to isomerization. This, however, introduces a further step and we find it somewhat more convenient to conduct all process steps on the glycerides and then saponify or split the glyceride to obtain the partially hydrogenated isomerized fatty acids.

In the appended claims we use the term "fish oils" to generically include the liquid fish oils and the liquid fatty acid mixture obtained by splitting the fish oil. Partial hydrogenation and isomerization raises the melting point of the fish-oils as well as the fish oil fatty acids and the melting point of the fat after partial hydrogenation and isomerization is an indication of the extent to which the fatty acids in said oil have been hardened.

After partial hydrogenation and isomerization, we can make soap directly from the treated fish oil or fish oil fatty acid in any of the customary ways. And we can split the treated fish oil to obtain the partially hydrogenated and isomerized fatty acids as such for use in the arts.

Having thus described our invention what we claim is:

1. The process of treating fish oils which comprises partially hydrogenating the oil to raise its melting point and then treating the partially hydrogenated oil with an isomerizing agent to further raise the melting point without substantially decreasing the unsaturation of the partially hydrogenated oil.

2. The process of treating fish oils to harden the same for use in making soap which comprises partially hydrogenating the oil until it is solid at room temperature but is still markedly unsaturated and then treating the partially hydrogenated oil with an isomerizing agent to further raise the melting point without substantially decreasing the unsaturation of the partially hydrogenated oil.

3. The process of treating fish oils to harden the same which comprises treating the oil with hydrogen to deodorize the oil and raise its melting point, the extent of hydrogen treatment being substantially insufficient to fully saturate the oil, and then treating the oil with an isomerizing agent to further raise the melting point but without substantially decreasing the unsaturation of the oil.

4. The process as in claim 1 wherein the oil is partially hydrogenated until the melting point is raised to about 30° to 35° C.

5. The process as in claim 2 wherein the oil is partially hydrogenated until the melting point is raised to about 30° to 35° C.

6. The process as in claim 3 wherein the oil is partially hydrogenated until the melting point is raised to about 30° to 35° C.

7. The process as in claim 1 wherein the partially hydrogenated oil is isomerized with selenium.

8. The process as in claim 2 wherein the partially hydrogenated oil is isomerized with selenium.

9. The process as in claim 3 wherein the partially hydrogenated oil is isomerized with selenium.

10. The process as in claim 1 wherein the oil is isomerized until its melting point is about 5° to 10° C. above the melting point of the partially hydrogenated oil.

11. The process as in claim 2 wherein the oil is isomerized until its melting point is about 5° to 10° C. above the melting point of the partially hydrogenated oil.

12. The process as in claim 3 wherein the oil is isomerized until its melting point is about 5° to 10° C. above the melting point of the partially hydrogenated oil.

ANDERSON W. RALSTON.
STEWART T. BAUER.